Dec. 20, 1955  W. L. A. BARTH  2,727,883
METHOD OF POLYMERIZING POLYALKYLENE POLYSULFIDES
Filed Dec. 19, 1952  3 Sheets-Sheet 1

INVENTOR
WALTHER L.A. BARTH
ATTORNEY

Dec. 20, 1955     W. L. A. BARTH     2,727,883
METHOD OF POLYMERIZING POLYALKYLENE POLYSULFIDES
Filed Dec. 19, 1952     3 Sheets-Sheet 3

INVENTOR
WALTHER L.A. BARTH
BY
ATTORNEY

United States Patent Office 2,727,883
Patented Dec. 20, 1955

2,727,883

METHOD OF POLYMERIZING POLYALKYLENE POLYSULFIDES

Walther L. A. Barth, Abington, Pa., assignor to Aero Service Corporation, Philadelphia, Pa., a corporation of Pennsylvania Application December 19, 1952, Serial No. 326,990

6 Claims. (Cl. 260—79.1)

The present invention relates to the polymerization of polyalkylene polysulfides and generally comparable organic materials particularly the liquid or semi-liquid polymerizable product now being marketed by Thiokol Corp., Trenton, N. J., under the trade designation Thiokol LP–2 the precise chemical composition of which is not known with certainty to the undersigned and may be subject to slight variations having little if any effect upon its properties; the said material however is believed to have an average structure corresponding to the formula $$HS—(R—S—S)_{23}—R—SH$$

in which R represents the organic group $$(C_2H_4—O—CH_2—O—C_2H_4)$$

It is a polyfunctional mercaptan the average molecular weight of which is 4000 and its terminal mercaptan groups are highly reactive so that in the presence of suitable oxidizing agents its polymerization takes place substantially in accordance with the following equation:

$$n(HS—(RSS)_{23}R—SH)+nO_2 \rightarrow (RSS—)_x+nH_2O$$

in which $n$ and $x$ are numerical values which may vary.

The activating agents heretofore available for inducing polymerization of this material have been reasonably satisfactory but for certain specialized uses it has been found that the times required for completing the reaction are unsuitable in respect either to the so called "working life" or the so called "curing time" or in respect to the ratio between them.

Working life in polymerization of materials of this kind has been defined as the time during which a mass of combined ingredients, including the material to be polymerized and other agents added to it for bringing about its polymerization and for other purposes, exists in a freely flowing state after having been brought together in intimate intermixture and until the mass loses this state although remaining initially as a liquid of a relatively high viscosity. The working life is followed by the curing time which is the period during which polymerization progresses toward evolution of the final product, usually a rubber-like semi-solid which after elapse of the curing time is indiscerptible and capable of preserving its dimensions and form substantially without change, resistant to relatively extreme temperatures, ozone and sunlight and not soluble in or attacked seriously by solvents, oils, greases and dilute aqueous solutions.

Normally when but a relatively short working life is required it can be obtained by the use of the known catalysts and activators and it is followed by a curing time satisfactory under most conditions but under special circumstances, as when large parts are being molded, it may be necessary to provide a relatively long working lige which when produced with these agents results in unduly prolonged curing time while in some instances it may be impossible to obtain a working life of sufficient duration to enable the materials to be mixed and properly disposed as in a mold or the like before its termination except under conditions prolonging the curing time to an impractical extent or even rendering the mass not curable at all.

It is therefore a principal object of this invention to provide a novel method of inducing polymerization of polysulfides of the character designated which enables the curing time to be properly regulated with relation to the working life and the total of working life and curing time confined within relatively definite predetermined and practical limits, thus facilitating production from such polysulfides of molded objects and the like more economically and satisfactorily than has been possible.

A further object is to provide a group or class of chemical reagents which when introduced with other materials in substantially less than stoichiometric proportions into complex polyfunctional mercaptans induce progressive polymerization of the latter at controlled rates to enable large and complex objects to be formed in suitable molds and even from a plurality of separate batches of the reactant mass without impairing the uniformity and indiscerptibility of the object formed.

Other objects, purposes and advantages of the invention will be understood or will appear from the following description of its practice in the polymerization of "Thiokol LP–2" or, briefly, LP–2, in accordance therewith, in which reference will be had to the accompanying drawings containing graphs representing the relative working life and curing time periods obtainable with different quantities of various reagents, including for purposes of comparison one of those heretofore generally employed.

Thus in the said drawing Fig. 1 is a logarithmic plotting of the working life and curing time variations corresponding to different proportions of diphenylguanidine (DPG) used as an activator in accordance with methods heretofore in use, the quantities thereof being expressed as mg. DPG/100 g. LP–2.

Figure 1:
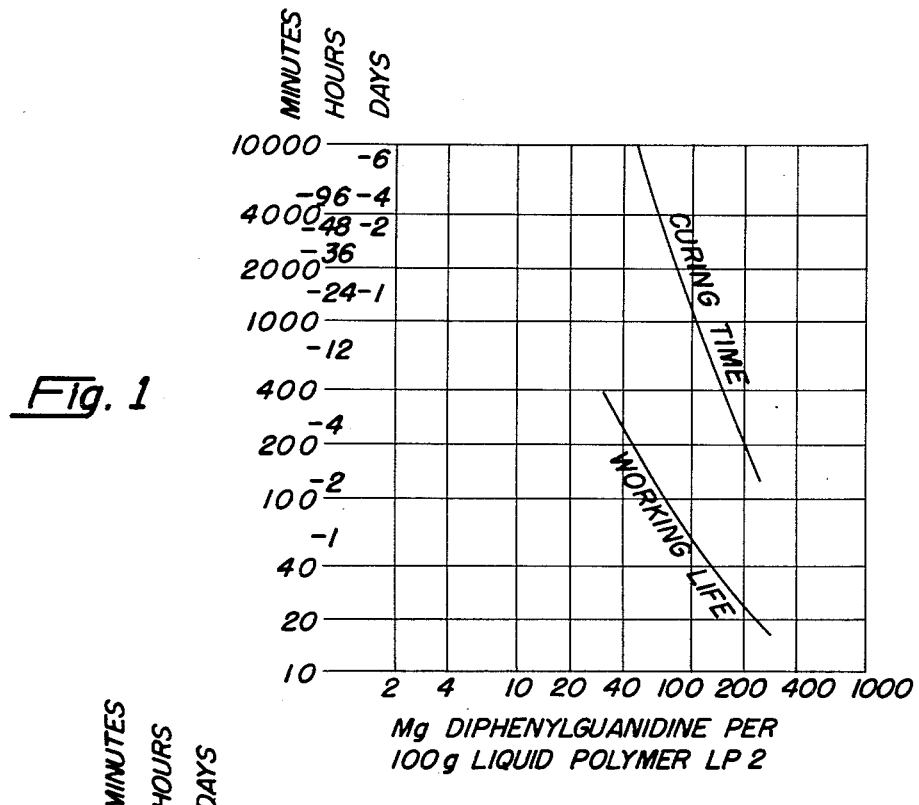

In the several figures the vertical axis represents the logarithmic time values and three scales showing minutes, hours and days respectively are included to facilitate interpretation.

As is well known LP–2 is a highly viscous liquid of amber color when pure, the technical grade normally containing fine dark particles of a gray brown color probably due to iron contamination. It is used in the preparation of a large variety of rubber-like articles, being polymerizable to a relatively inert substance eminently suitable for relief maps where accuracy of dimension and form are of extreme importance together with immunity to breakage or permanent deformation through inadvertent impact of hard objects, such maps being used extensively for certain training and educational purposes as well as for demonstration and display.

In accordance with the invention preparatory to pouring the material into a previously prepared mold LP–2 is mixed with certain other ingredients including pigments, fillers, plasticizers, catalysts and activators the proportions of which in relation to the LP–2 may vary in accordance with the specific purpose for which the product is to be used.

It has been the practice to employ zinc sulfide as a pigment, dibutyl phthalate as a plasticizer, cumene hydroperoxide as a catalyst and diphenylguanidine as an activator rendering the mass alkaline which is essential to the reaction when cumene hydroperoxide acts as a catalyst as well as an oxidizing agent. It has been found, however, that when the working life is extended by appropriate proportioning of these ingredients the curing time is likewise extended sometimes to 20 to 40 times as long as the working life and efforts to obtain a working life of two hours or more sometimes result in mixtures which cannot be cured or cannot be cured within any reasonably practical period of time.

As considerations of efficiency dictate that the curing time be made as short as possible whether the working life be long or short, it is impractical to use the reagents just mentioned when a relatively long working life is required and the utility of polymerizable polysulfides of the class here under discussion has heretofore been limited by that fact.

I have discovered, however, that when a suitable iodine donor is added to LP-2 in the presence of other reagents the working life can be controlled and extended, even to more than six hours if required, without unduly extending the curing time which for practical purposes it is considered should not exceed four days since if the curing time be prolonged beyond this limit an unsatisfactory product may result.

More specifically, I have found that when there is added to 100 parts by weight of LP-2 about 26.5 parts of dibutyl phthalate, zinc sulfide 46.70 parts, elemental iodine in a 0.5% solution in dibutyl phthalate 0.03 part, cumene hydroperoxide 8.25 parts and 0.22 part of a suitable anti-foaming compound such as that available in the market under the trade name "Dow-Corning anti-foam" supplied in 50% solution in benzol, a working life of 3 hours and 50 minutes is attained and on standing overnight the mass is found to have jelled by morning while at the expiration of two days after pouring the fully polymerized material may be removed from the mold and subjected to whatever finishing treatment may be desired, this treatment, in the manufacture of relief maps, usually including surface lettering, coloring and the like.

As the iodine donor I may also use compounds of iodine as distinguished from the element itself in solution, compounds which have been found most effective including potassium iodide (KI), ammonium iodide (NH4I), hydriodic acid (HI), cadmium iodide (CdI2), mercuric iodide (HgI2), mercurous iodide (Hg2I2) and numerous organic iodine compounds such as the butyl iodides, lauryl iodide, pentamethylene iodide, erythrosine and substantially any organic compound containing iodine loosely bound in the molecule.

Whether iodine itself or a compound thereof be used it is evident that but a small quantity in relation to the amount of LP-2 is required and this may be due to the cyclic nature of the action of iodine in the mass which I believe proceeds in accordance with substantially the following equation:

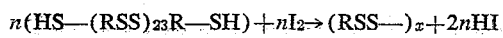

$$n(HS-(RSS)_{23}R-SH)+nI_2 \rightarrow (RSS-)_x+2nHI$$

As this reaction proceeds, producing free hydriodic acid in the mass, it is believed the latter upon its generation reacts with the cumene hydroperoxide or other oxidizing agent present to regenerate elemental iodine which thereupon reacts to polymerize more of the LP-2 and produce additional hydriodic acid for regeneration by more of the peroxide again into free iodine and that the related reactions proceed progressively and concurrently until all the monomer present has been polymerized, any residue of peroxide and iodine remaining in the mass having no noticeable effect upon the final properties of the polymerized material. Similarly when compounds of iodine are employed it is believed they first react with the oxidizing agent to produce free iodine which then reacts as above with the LP-2 to initiate a corresponding cyclic operation.

To illustrate graphically the results attainable in accordance with the invention the figures in the drawing represent data derived from actual test runs and show that where DPG is used as an activator and cumene hydroperoxide as the oxidizer, with a working life of about 15 minutes the curing time is about an hour and a half or six times as great, but when a working life of say 2½ hours is required the curing time may exceed six days or more than fifty times the working life.

By comparison when iodine is employed, and this incidentally does not, like cumene hydroperoxide when used as oxidizer, require the presence of an alkali, working life is 15 minutes with 130 mg. I2/100 g. LP-2, and curing time less than one hour; a 3 hour working life can be obtained with 15 mg. I2/100 g. LP-2 while extending the curing time only to about ten hours, which is well within the limit of practical utility.

Figure 2:
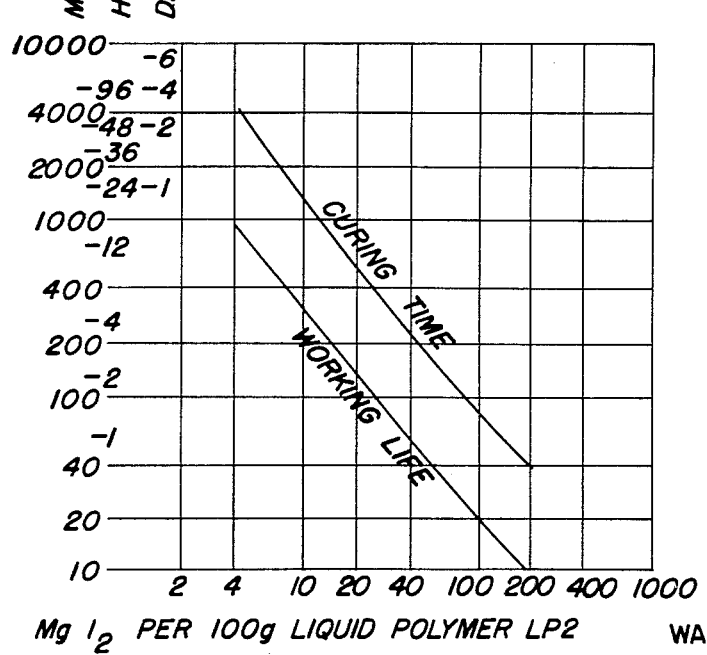
Fig. 2 is a corresponding plotting showing the results obtained by using elemental iodine (I₂) as an activator in accordance with the invention, amounts of the activator likewise being expressed in terms of mg./100 g. LP–2.

Moreover as indicated in Fig. 2 the working life may be even further prolonged to as much as 12 hours without extending the curing time beyond the three day limit, although only rarely if ever is a working life of such duration required.

Figure 3:
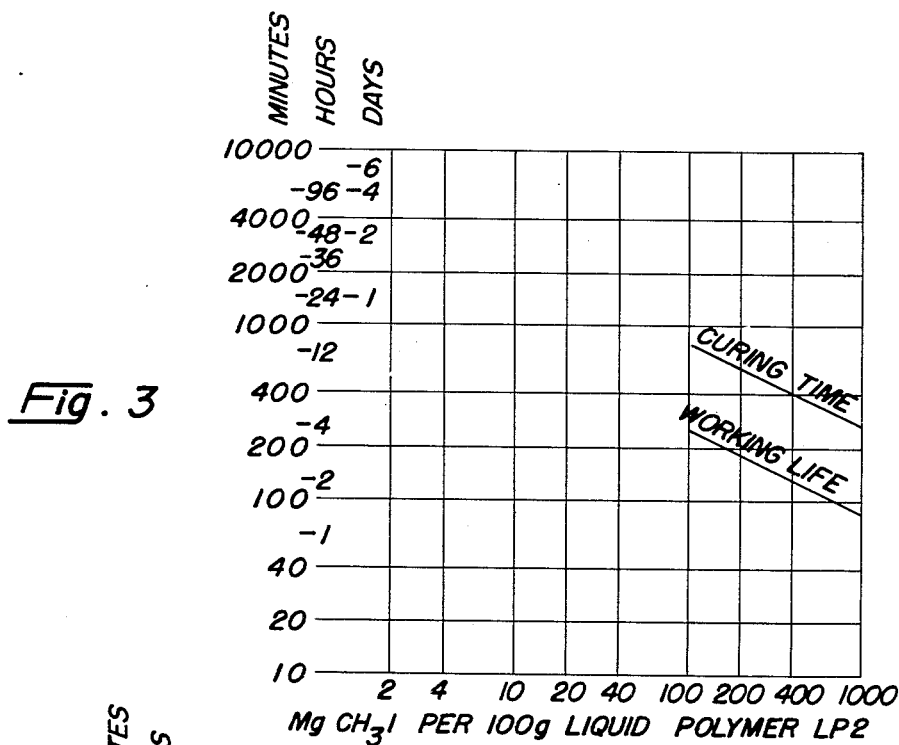
Fig. 3 is a similar plotting of results obtainable by the use of methyl iodide (CH₃I) in accordance with the invention, wherein the amounts of activator are expressed in terms of mg./100 g. LP–2.

Fig. 3 similarly shows the results obtainable from the use of methyl iodide (CH3I), which although not particularly suitable for use when a working life of but a few minutes is desired, gives excellent results in regard to the ratio of working life to curing time in the working life range between about 40 minutes and about 4 hours.

Thus as this figure shows, with a working life of 42 minutes the curing time is only 2 hours and 10 minutes or a ratio of approximately 1:3 and when the working life is four hours the curing time is less than 12 hours and thus also within the 1:3 ratio.

Figure 4:
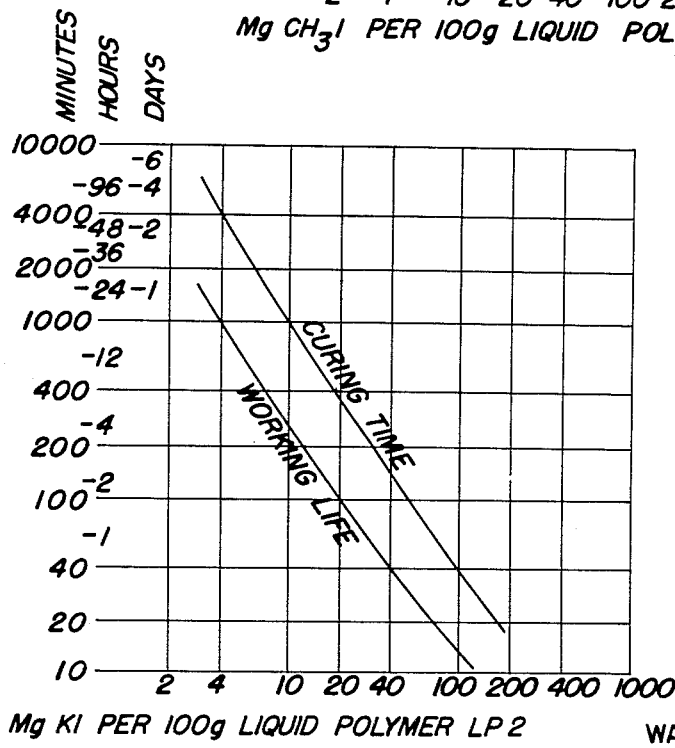
Fig. 4 is a corresponding plotting of the effects of potassium iodide (KI) expressed in mg./100 g. LP–2, and Fig. 5 in like terms shows the effects of like unit quantities of ammonium iodide (NH₄I).

To attain an extremely long working life potassium iodide (KI) may be preferred, since as shown in Fig. 4 it is practical by its use in the proportion of about 0.5 mg./100 g. LP-2 to obtain a working life of 12 hours with a curing time of only 42 hours, and hence in a ratio of 1 to less than 4 in a working life range at which use of DPG results in a mass which is not curable at all.

Figure 5:
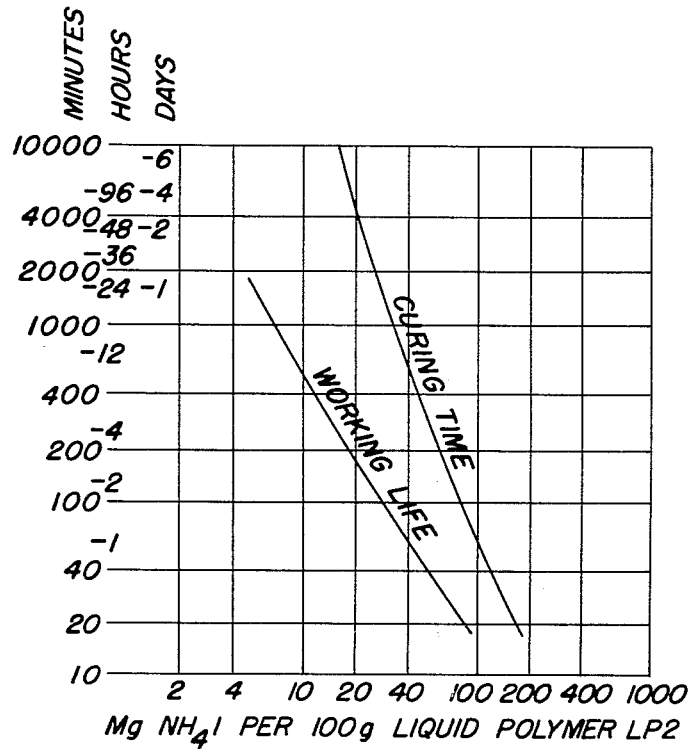

Ammonium iodide (NH4I) while perhaps not so desirable as an iodine donor as other materials to which reference has been made is shown in Fig. 5 to be nevertheless capable of affording a working life of two hours or more without exceeding the practical limit of 3 days in curing time and there are many instances in which it may be employed with advantage.

Thus the data plotted on the graphs in the drawing demonstrate that with DPG used as activator and cumene hydroperoxide as oxidizer the maximum working life within the practical curing time limit stated is less than 2 hours while use of the activators and oxidizers contemplated by my invention permits substantial prolongation of the working life, even to 12 hours or more (with KI), without exceeding the said limit, while the iodine donors, in addition to rendering it unnecessary to provide an alkaline medium moreover afford improved hardness characteristics in the finished product which in addition has exceptional properties in regard to cohesion, rollability, and elasticity as well as in its resistance to scratching and to crazing or checking when bent. Furthermore whereas when DPG and cumene hydroperoxide are used not only does the curing time increase as the working life is increased, but its rate of increase is much more rapid so that the ratio of working life to curing time becomes progressively more unfavorable as the former is lengthened. For example with DPG and cumene hydroperoxide at 1 hour working life the curing time is 22 hours or a ratio of 1:22 while at 2 hours working life the curing time becomes 3½ days or a ratio of 1:42 and in the absence of sufficient alkali in the mass, as with the pH value lower than about 9–10, even less favorable results are obtained.

It is recognized that the use of iodine as an oxidizing agent to convert mercaptans to disulfides has long been known, this reaction according to Kekule and Linnemann, Annalen 123,277 (1862) requiring a strongly alkaline medium such as a 15% solution of sodium hydroxide, which enters into the reaction to produce the sodium mercaptide as an intermediate product according to the following equation:

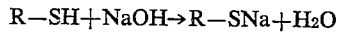

The said product then reacts with iodine to produce the disulfide

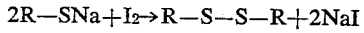

But in this reaction there is no regeneration of elemental iodine and substantinally stoichiometric quantities of the reagents are therefore required to carry it to near completion whereas in accordance with my invention the iodine supplied by the iodine donor is regenerated as above noted and relatively infinitesimal quantities of it are required.

Thus, expressed in molar ratios, from about $1/10,000$ to $1/50$ mol of the iodine donor per mol LP-2 is adequate to bring about complete polymerization within practical time limits as to working life and curing time and the ratio between them, leaving in the finished product only inappreciable quantities of any iodine bearing residue which has no noticeable effect on its properties, whereas in the preparation of disulfide in accordance with the method of Kekule and Linnemann the final reaction mass contains 2 mols NaI per mol of the disulfide.

I have found moreover that when an approximately stoichiometric quantity of iodine is added to LP-2 and without an oxidizer for reaction with HI as it is produced, a strong odor similar to that of $H_2S$ soon develops, indicating decomposition rather than polymerization of the LP-2 and resulting in production of a non-curable malodorous liquid having no similarity with polymerized LP-2 and no known or imaginable usefulness.

Some reference has been made to the use in accordance with the invention of iodides of certain metals, among which potassium iodide has been found very effective as an iodine donor and in fact substantially any organic iodide in which the iodine is but loosely bound may likewise be employed, but I have found that organic iodides in which a strong bond exists between the iodine and an organic group are not effective, including in this class such strongly bound compounds as iodocyclohexane and 2-iododiphenyl.

However the effectiveness of those iodine donors suitable for the practice of the invention is not particularly dependent on the alkalinity or acidity of the environment in which they are used. Thus while the diphenylguanidine-cumene hydroperoxide system is unsatisfactory in an acid medium while other polymerizing agents, for example, furfural, normally require an acid medium, the said iodine donors promote polymerization effectively in acid, alkaline and neutral media.

For example, with cumene hydroperoxide, iodine as a donor in a neutral or possibly slightly alkaline medium may afford a working life of three hours and curing time overnight, and under the same conditions but with the medium rendered acidic by addition of 1 part octoic acid per 100 parts LP-2 the working life is reduced to one hour and the curing time to four hours.

A particular advantage of the invention resides in the capacity it affords for effecting polymerization of organic polysulfides in the absence of alkali or with but relatively insignificant quantities of alkali present, as the physical properties of the polymerized product are thereby greatly improved. For example, when produced in an alkaline medium the Shore hardness of the product rarely exceeds 25 and may be as low as 20 whereas in accordance with the invention products having Shore hardness of 30–40 may be obtained with substantially greater elasticity and tear resistance; moreover the viscosity of the mix during its working life is extremely low, thereby greatly facilitating its pouring and distribution into intricate molds for making gaskets, relief maps, toys, advertising novelties or the like, or on the surfaces of materials to be joined when it is used as an adhesive or those of an object being covered, lined or otherwise provided with a closely adherent surface coating of the polymerized material; it also may be used for impregnating leather and fabrics, in the manufacture of paints, as a sealer and for many other purposes where ultimate formation of a flexible semi-solid is desired.

Consequently while I have herein described the invention more particularly in relation to its usefulness in the manufacture of relief maps, in which field it has thus far shown perhaps its maximum utility, and have suggested modifications and certain alternatives to adapt it to a wide variety of operational conditions or employment I do not desire or intend to limit or confine myself thereto in any way as other changes and modifications in the procedures and purposes of the method and in the specific reagents employed will readily occur to those skilled in the art and may be adopted if desired without departing from the spirit and scope of the invention as defined in the appended claims.

Having thus described my invention, I claim and desire to protect by Letters Patent of the United States:

1. The method of polymerizing a polyalkylene polysulfide containing at least two carbon-attached —SH groups which comprises mixing with said polysulfide an oxidizing agent and an iodine donor selected from the group consisting of iodine, inorganic iodides and organic iodides in which the iodine is loosely bound in the molecule, and then disposing the mixture in a stationary situation until an indiscerptible mass of polymerized material has been formed.

2. The method of polymerizing a polyalkylene polysulfide containing at least two carbon-attached —SH groups which comprises mixing with said polysulfide an oxidizing agent and, in proportion not less than about .5 mg. and not more than about 5 g. per 100 g. of the polysulfide, an iodine donor selected from the group consisting of iodine, inorganic iodides and organic iodides in which the iodine is loosely bound in the molecule and then disposing the mixture in a stationary situation until an indiscerptible mass of polymerized material has been formed.

3. A method as defined in claim 2 in which the proportion of the iodine donor is not less than about 5 mg. and not more than about 200 mg. and the iodine donor is elemental iodine.

4. A method as defined in claim 2 in which the proportion of the iodine donor is not less than about .10 g. and not more than about 4 g. and the iodine donor is methyl iodide.

5. A method as defined in claim 2 in which the proportion of the iodine donor is not less than about 4 mg. and not more than about 100 mg. and the iodine donor is potassium iodide.

6. A method as defined in claim 2 in which the proportion of the iodine donor is not less than about 20 mg. and not more than about 150 mg. and the iodine donor is ammonium iodide.

References Cited in the file of this patent

UNITED STATES PATENTS

| | | |
|---|---|---|
| 2,466,963 | Patrick et al. | Apr. 12, 1949 |
| 2,606,173 | Fettes | Aug. 5, 1952 |